United States Patent [19]
Morgan

[11] Patent Number: 5,312,148
[45] Date of Patent: May 17, 1994

[54] RAMP

[76] Inventor: Alfred W. Morgan, P.O. Box 497, Ipswich, Qld. 4305, Australia

[21] Appl. No.: 948,436

[22] Filed: Sep. 22, 1992

[30] Foreign Application Priority Data

Apr. 23, 1992 [AU] Australia ................................. 2042
Jul. 21, 1992 [AU] Australia ................................. 3663

[51] Int. Cl.$^5$ ................................................ B60P 1/44
[52] U.S. Cl. ........................................ 296/61; 414/537
[58] Field of Search ................... 296/610, 62; 414/537

[56] References Cited

U.S. PATENT DOCUMENTS 3,352,440 11/1967 Wilson ................................. 414/537
3,642,156 2/1972 Stenson ................................. 296/61
3,834,565 9/1974 Goodman, Jr. et al. ............ 414/537

Primary Examiner—Robert R. Song
Attorney, Agent, or Firm—Kimmel, Crowell & Weaver

[57] ABSTRACT

A tailgate ramp extends the tailgate with three hinged panels (13, 14, 15) able to fold out to a co-planar position whereat each hinge (51, 55) is braced by a system of struts (21, 26) and cables (22, 25) against opening past 180°. The cables (22, 25) and struts (21, 26) are arranged to permit the outermost panel (15) to fold into between the other two (13, 14) to collapse into a pack against the inner face of the tailgate. The system of cables (21, 26) at each hinge (51, 55) can be passed around sheaves (29-32, 37-40) at each side of the ramp in a single length to balance loads on the ramp.

13 Claims, 6 Drawing Sheets

FIG. IB
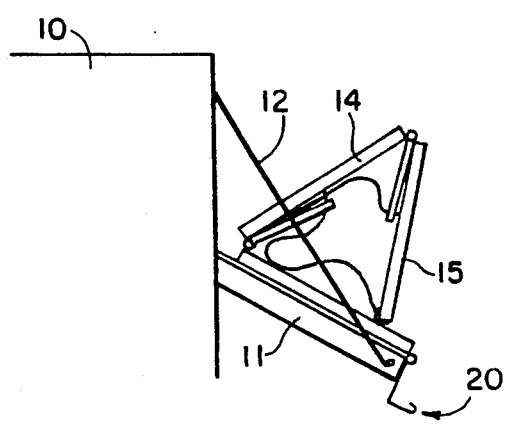
FIG. IC
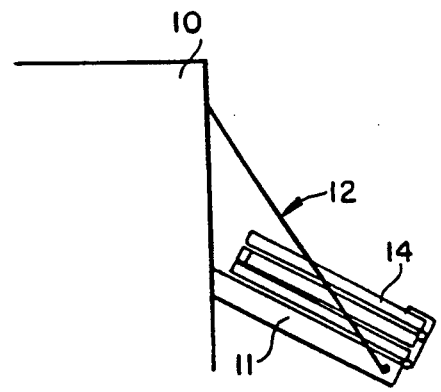
FIG. ID
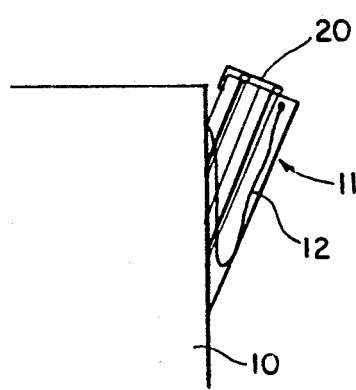
FIG. IE
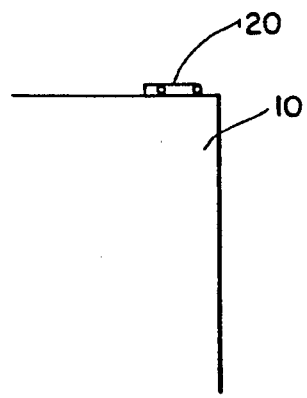

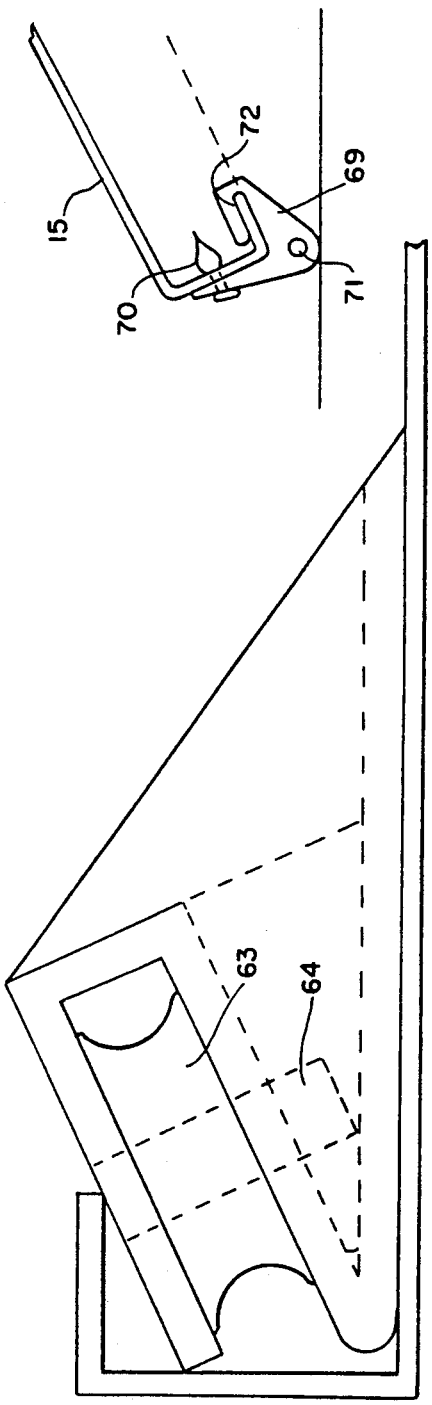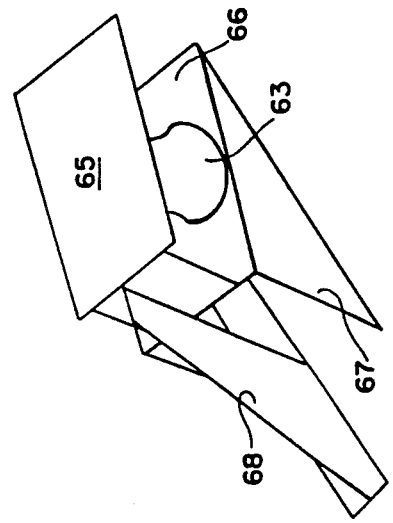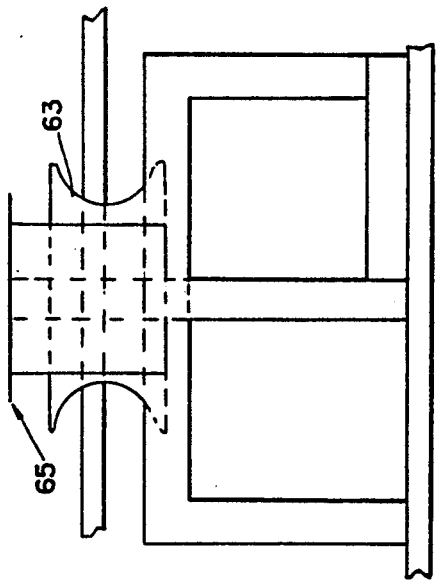

RAMP

BACKGROUND OF THE INVENTION (1) Field of the Invention

This invention relates to ramps and, in particular, to collapsible ramps capable of attaching to or folding into or onto the tailgate of a pickup truck.

(2) Prior Art

Various types of collapsible ramps are developed for use with motor vehicles and the like. It is known to provide ramps which can be collapsed down to a pack which is able to be attached to or nest within the volume of a pickup truck tailgate.

In U.S. Pat. No. 4,527,941, a lazy tong mechanism is used to enable a number of planks or panels to be collapsed into a pack at the rear of the vehicle for extension therefrom. The lazy tong structure is not readily adapted for load bearing and the collapsed pack it establishes has a substantial width. U.S. Pat. No. 4,571,144 is another lazy tong structure but this time mounted to the tailgate rather than to the vehicle floor as in U.S. Pat. No. 4,527,941. Again, this structure is not readily strengthened and it is not adapted for collapsing into a thin pack which does not add substantially to the volume of the tailgate.

In U.S. Pat. No. 4,864,673, a telescoped deck is extended out over a foldable support. Strength under load is achieved through the foldable support. Load bearing is essentially achieved by a simple beam which will bend under load unless considerable cross-sectional dimensions are used which adds to weight. In U.S. Pat. No. 4,944,546, the panels are hinged to one another to be folded into a pack which in its extended position extends legs to provide for load support. Good load support might be achieved this way but the ramp is only useful on level ground able to support the legs.

In U.S. Pat. No. 4,761,847 is shown a portable ramp comprised of hinged panels which are supported under load by a system of cables holding the panels at 180° against further folding downwards with the load at the hinges. However, U.S. Pat. No. 4,761,847 does not describe how a multiple hinged ramp would be strengthened this way and collapsed into a compact pack useful as a tailgate ramp.

In U.S. Pat. No. 3,976,209 to Burton, there is described a two panel ramp (three if the tailgate panel is counted) with hinges enabling collapse into a vehicle tailgate. At one hinge, a system of struts equivalent to the cables of U.S. Pat. No. 4,61,847 provides load bearing support. At the other hinge, support is achieved from the tailgate sides by angular displacement limiting ties. U.S. Pat. No. 3,976,209 is limited to three panels and as these have a length equal to the tailgate height, the length of the ramp is determined.

SUMMARY OF THE INVENTION

It is an object of the present invention to provide a collapsible ramp for a pickup truck of the type set out above with three hinged panels which are able to be collapsed into the tailgate.

The invention achieves its object in provision of a collapsible ramp for connection to a vehicle tailgate which ramp comprises:

three hingedly interconnected wings which, in use, extend the length of the vehicle tailgate substantially four fold;

said wings being hingedly connected to the tailgate for collapsing into a flat pack against the tailgate;

the wings being supported, in their extended position, against loads thereon by a system of cables therebeneath, stretched over struts at hinges between adjoining wings;

each pair of wings having one or more struts therebetween, projected, in use, downwardly with a cable spanned thereover and attached to the wings, the struts being pivotally mounted on the hinge pins of the hinges between the wings so as to permit collapse into a flat pack.

The term wing used throughout this specification is intended to include sheet metal panels formed to constitute the wing and other constructs such as planar frameworks provided with surfaces suited to the passage of vehicle wheels, etc., either completely covered or provided with surfaces only where required for passage of a wheel.

The above defined flat pack is readily used, as in the prior art on a pickup truck as part of its tailgate or as an extension thereto. It provides an extra panel over the prior art to enable a longer extended ramp than has been previously possible. An additional panel might be used to create a four panel pack which additional panel attaches face-to-face against the inside of the tailgate. The provision of this panel achieves not only a means by which the ramp might be attached to the inner face of a tailgate but it also enables the tailgate to be given a matching non-skid surface equal to the rest of the ramp. Load bearing is achieved without the need of legs so that the condition of the ground is not a factor as is the case with leg supported ramps. The nature of the strut and cable support is such as to enable a thinner flat pack to be achieved than would otherwise be the case, with a thickness advantage particularly suited to mounting the ramp as part of a vehicle tailgate. Adoption of the cable over strut support at each hinge enables good load support to be readily achieved by appropriate selection of cable and design of strut. In addition to performing as a ramp for loading items onto a pickup truck, the ramp might be supported horizontally to extend the pickup truck bed horizontally, if required. To do this simply requires an equal height support and legs might be provided for this use.

BRIEF DESCRIPTION OF THE DRAWINGS

The invention will now be described with reference to a preferred embodiment as shown in the accompanying drawings in which:

FIGS. 1A to 1E are side elevations showing the ramp of the present invention in different stages of collapse from extended (FIG. 1A) to fully collapsed (FIG. 1E);

FIGS. 3 to 5 are cross-sectional details of the hinges used in the ramp of FIGS. 1 and 2;

FIGS. 6 to 11 are details of various elements which might be incorporated into the ramp of FIGS. 1 and 2.

DETAILED DESCRIPTION OF THE PREFERRED EMBODIMENTS

Figure 1A:
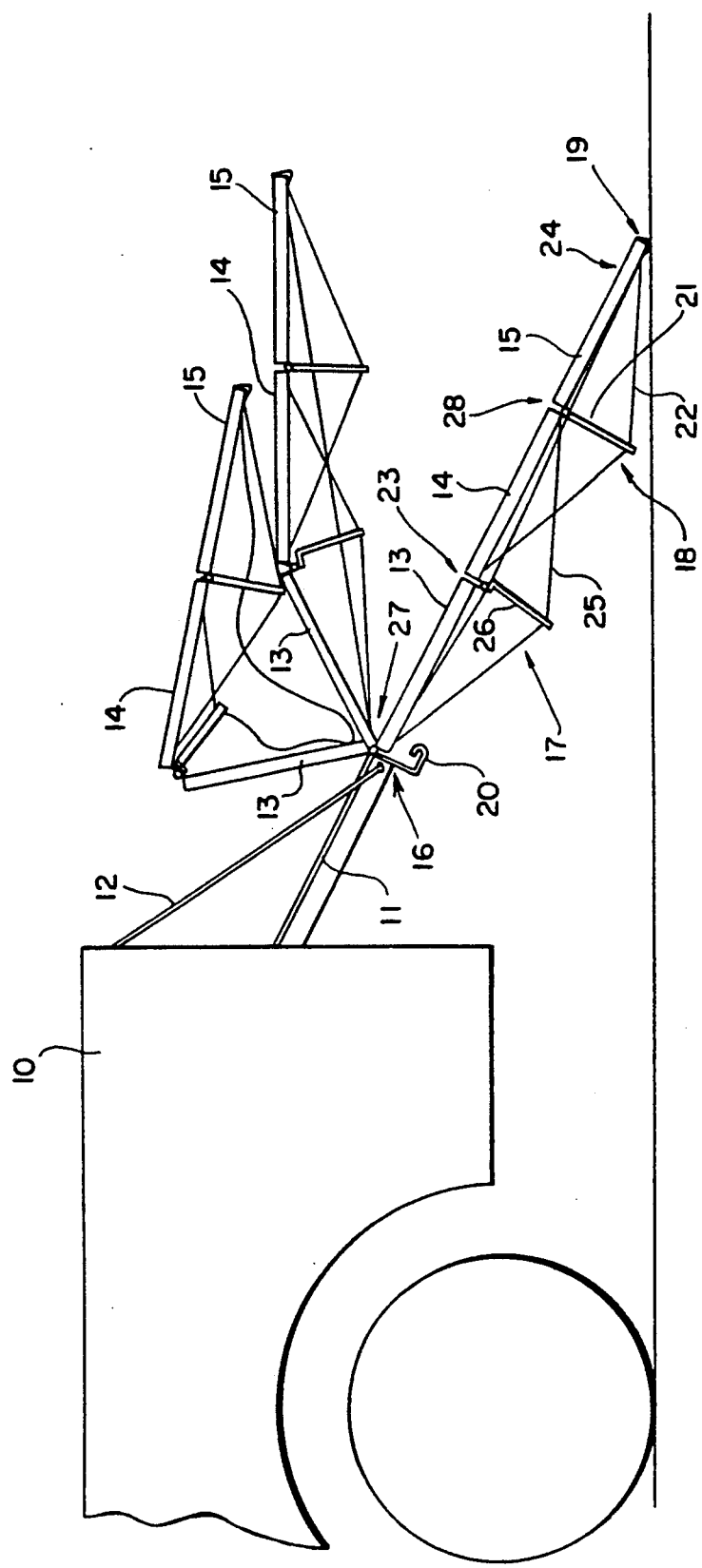

In FIG. 1A a pickup truck 10 can have a plate or panel 11 as the means by which the ramp may be mounted to a tailgate, which, in use, can be attached to the inner surface of the tailgate as shown. The tailgate can be supported in the usual way at a desired inclination by a cable, chain, etc. 12. Extended from the plate or panel 11 are panels 13, 14 and 15 with hinges therebetween as will be described in greater detail below. End 19 extends to the ground and with panels 13, 14 and 15, each substantially being dimensioned in the direction of the ramp with a dimension generally equivalent to the usual tailgate height (panel 15 is slightly reduced in dimension relative to the other panels to permit folding), the length of the ramp is significantly longer. The increased length reduces the slope of the ramp. The panels are supported in their co-planar disposition by means of the system of cables over, preferably, pairs of struts at 17 and 18 as will become more clear below. The system of cables over struts at the hinges between panels 13 and 14 and 14 and 15 at 17 and 18 enables a desired load bearing capacity to be catered for by choice of cable and strut strengths. The ramp's flat form is maintained in the hinge at 16 by reason of the fixed position of the outer edge of panel 11 limited by cable 12 and also by reason that the end 19 of the ramp is rested on the ground. Some flexing at this joint will result out of any depression of the pickup bed under loads which depress its suspension.

By suitable adaptation, as will be described below, the hinges between panels 13 and 14 can be made to fold first, as is seen in the collapsing elevations of FIGS. 1A to 1E. In the collapsing process, panel 13 collapses onto panel 11 and panel 15 tucks in under panel 14 so that panels 11 and 14 are the outermost panels of the resulting pack attached to the tailgate. A pivotally mounted clip or handle 20 can be provided to capture the collapsed pack and retain it in that state. The clip or handle 20 is mounted on the hinge pin of hinge 60 of FIG. 5.

In FIG. 1A, the hinge between panels 14 and 15 has one or more struts, preferably 2, one to each side of the ramp, such as strut 21 projected away from the hinge, orthogonally, in the extended position of the ramp, with cable 22 passed thereover between points 23 and 24 to be in tension under load at the co-planar extended position of panels 14 and 15. A similar cable 25 spans across strut 26 between points 27 and 28 to hold panels 13 and 14 at a co-planar position under load on the ramp.

Figure 2:
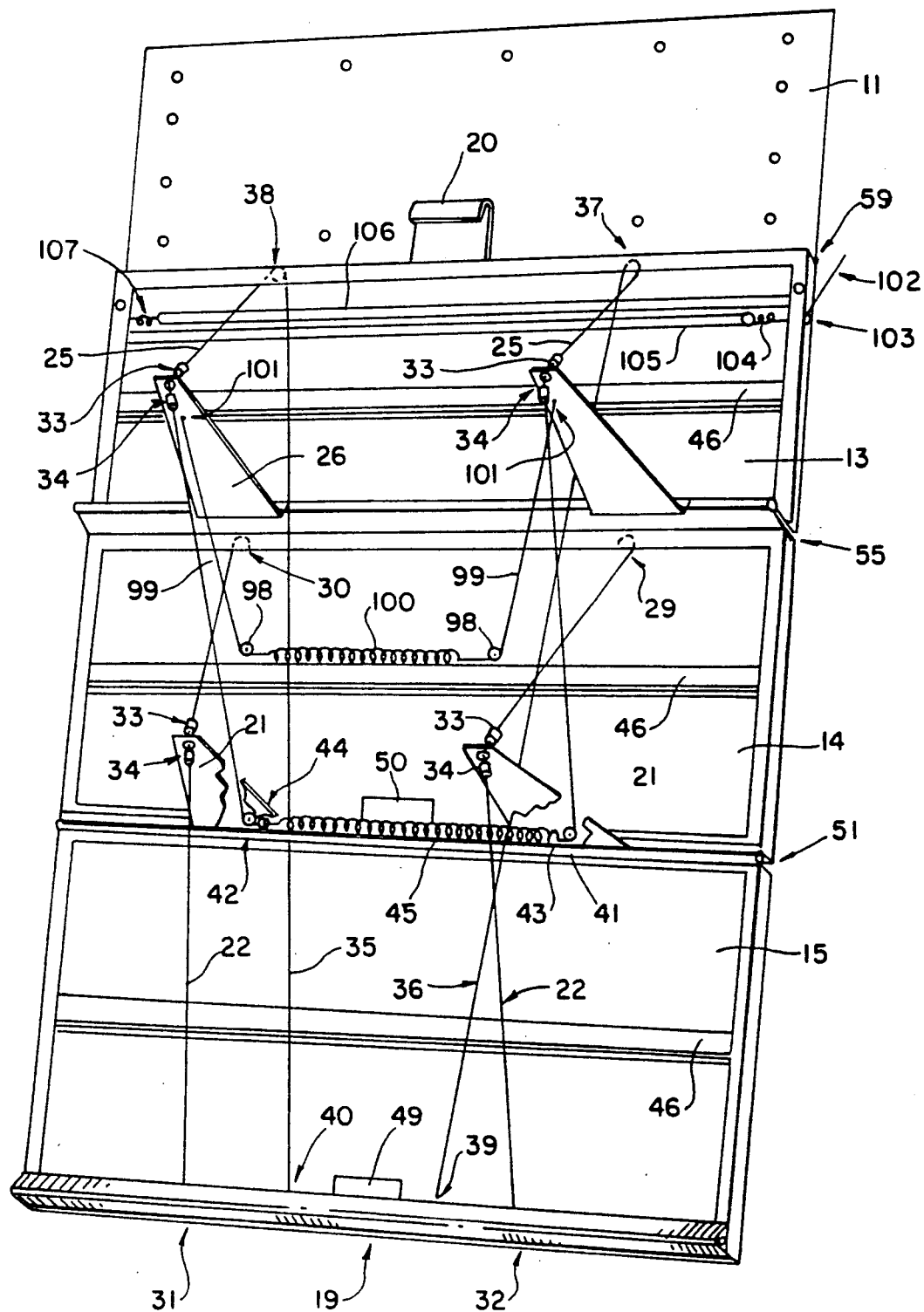
FIG. 2 is a view of the ramp of the present invention seen from below when in its extended disposition.

FIG. 2 shows the extended ramp from below. Cable 22 is a cable in a loop about sheaves, described in greater detail below, at the corners 29 and 30. The cable 22 is fixed at points 31 and 32. Cable stops are attached to the cable at 33 and 34 to maintain the 90° position of the strut support to the ramp in its extended position. Cable 25 is a cable with runs 35 and 36 extending the length of the ramp and passed around sheaves at 37 to 40. The cable 25 passes around sheaves at 41 and 42 to connect with a coil spring 45 which is fully extended as shown when the ramp is extended. Cable stops are fitted at 43 and 44 to limit the extension. Cable stops are also fitted at 33 and 34 as described above for cable 22 to maintain the angle of the strut supports.

Figures 3, 4, 5, 6, 7:
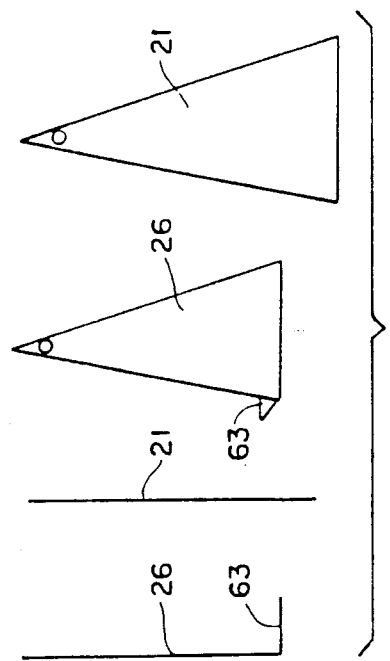

In order that the panels 13 to 15 be constructed with good strength but limited weight, each panel might be prepared from sheet stock with a boxed edge or perimeter beam folded from the material of the panel. Each panel might be further strengthened by one or more sections such as 46 thereacross which is seen in FIG. 7 with a box section over two base flanges 47 and 48 which, in use, are fixed flat against the panel material. Panels 15 and 14 may be provided with folded and rolled cut outs 49 and 50 respectively, to act as handles by which the ramp might be extended and folded.

FIG. 3 is a cross-section through the hinge at 51 between panels 14 and 15 of FIG. 2. The panels 14 and 15 are interconnected by a hinge pivoted at 52 with hinge plates 53 and 54 attached to co-planar surfaces of panels 14 and 15 to enable them to fold together downwardly in the sense of FIG. 3.

FIG. 4 is a cross-section through the hinge at 55 between panels 13 and 14 of FIG. 2. The panels 13 and 14 are pivoted on a hinge pin at 56 with hinge plates 57 and 58 attached to the edges of panel 13 and 14 as shown. The pivot 56 is stood off the surface of the panels so that when they are folded downwardly in the sense of FIG. 3, a space is created therebetween into which panel 15 nests when the ramp is collapsed.

In FIG. 5 is seen a cross-section through the hinge at 59 in FIG. 2 between panels 11 and 13. The panels 11 and 13 are pivoted on a pin at 60 with hinge plates 62 and 61 attached at the edge and surface of panel 13 and 11 respectively.

In FIG. 6 is seen side and elevations of the two types of strut 21 and 26 as seen in FIG. 2. Strut 21 may be plate form and mounted on a knuckle means as described below which shares the hinge pin of the hinge at 51. Strut 26 has a flange 63 which attaches to a knuckle means as described below which shares the hinge pin at the hinge at 57 to stand the strut 26 sideways off the pivot pin to enable folding with the strut nested between the folded panels.

FIGS. 8 and 9 are elevation and isometric respectively of a sheave and its mounting. The sheave is employed at the corners of the cable system of FIG. 2 to support the two systems of cable.

FIGS. 8 to 10 show views of a sheave from the side, in perspective and at the front respectively. Sheave 63 is mounted on pin 64 supported between plates 65 and 66 on wedge supports 67 which attach to the panels to create the desired angle for the cable run out to the support strut.

FIG. 11 shows in a longitudinal section, the bottom end of panel 15 which is provided with a cushion, preferably an extruded rubber cushion 69, which can extend the width of the ramp at the end of panel 15. The cushion 69 can be attached with holding grommets such as grommet 70. The rubber cushion might be formed, as by extrusion, with a hole 71 to add to its cushioning effect and to absorb the slight extended movement of the ramp of the end at the ramp caused by depression of the pickup truck suspension under load. Lip 72 to assists in holding the cushion to the panel.

The above invention in its preferred form is mainly characterized by the combination of specially designed hinges and knuckle means sharing common hinge pins, being made rigid and supported at the 180° disposition of the panels by two systems of cables that are activated by the movement of each panel, both collectively with each of the other panels at different stages of their operational movements, and singularly at such points of operation as required. This is done by the two sets of cables transversing through and connecting to a given number of points located at various positions on the underside of the ramp. Careful choice of materials enables weight reduction for any given load capacity. Longer life is achieved by careful choice of materials as will be clear to those skilled in the art.

The full travel allowed cable 25 which is attached at points most distant from each other, performs two major functions. The first function allows enough cable to pass through its sheaves so that enough cable length is attained to allow the enveloping of panel 15 between panels 13 and 14 when in the folded and stored position. This has been done while still maintaining the absolute stopping and locked position of the support brackets when the ramp is in its fully extended position. The more weight that is applied to any one portion or panel of the ramp, the more is increased the pressure on the remaining panels to stay in their down and locked positions. The second function performed by the full travel of cable 25 is that through an expansion spring 45 the two ramp panels 13 and 14 will, upon the lifting of the end 19 of the ramp, cause their hinge to buckle or activate first which in turn immediately takes away the need to continue to raise the end of the ramp but allows the holder to move forward with the ramp as it is continuing its folding action as seen in FIG. 1.

The sheaves through which the cables traverse, described above, will allow that, regardless of whether or not the slope of the ground is exactly parallel to the slope of the bed of the pickup, exact equal pressure being distributed to either side of the cable support system of the ramp so that the ramp will not torque, bend or collapse as all other ramps known will do under the same situation. This ramp can also be used at any height from the ground up to above the horizontal with no loss of any of its attributes. A hinged locking type handle 20 makes the safe securement of the ramp very simple and easy. It can be spring-loaded to take only the pushing of a sliding button, of any of the usual types, to pop open and then be in an out of the way position until ready for relocking. Small hard rubber blocks can be placed at points just behind the tailgate on the bed of the pickup that act as permanent stops for the ramp when it is in its fully stored position with the pickup tailgate in its closed position. Less than 4 inches of space can be used on the inside of the tailgate in a typical application of the above described ramp and the ramp is virtually out of sight when not in use. The extension range of the ramp of this invention with its ability to support, typically, depending on design, over one ton of wheeled on weight makes for easier loading. Clearly, the load bearing capacity is a matter of design of the panels and the cables with adequate load bearing being in mind when the parameters of these elements are selected.

Figure 12:
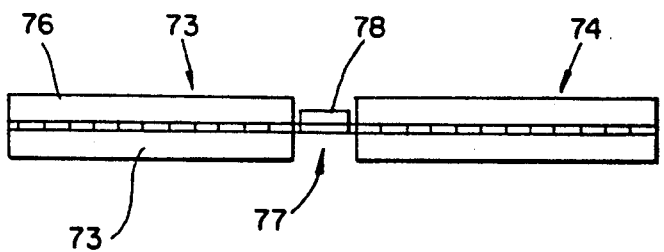
FIGS. 12 to 17 are views of various types of hinges used in the collapsible ramp of FIGS. 1 to 11.

In FIG. 12 is illustrated the structure of the hinge at 59 of FIG. 2. The hinge is in two parts 73 and 74, spaced apart to leave a gap 77 therebetween on a common hinge pin. The hinge plates such as 75 and 76 of part 73 may be piano style hinges made of suitable steels to withstand stresses on the ramp in use. In the gap 77 is pivoted a knuckle means or plate 78 to which the clip or handle 20 of FIG. 2 can be attached to be freely pivoted between the two hinges 73 and 74.

Figure 13:
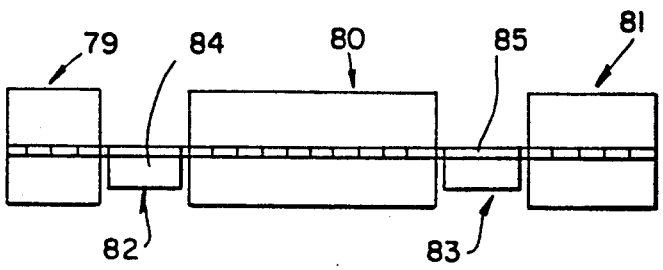

In FIG. 13 is illustrated the structure of the hinge at 55 in FIG. 2. The hinge is in three parts 79 to 81 with two gaps in between, 82 and 83, in which are pivotally mounted knuckles 84 and 85 all on a common pivot pin. The struts or cable supports 26 of FIG. 2 are attached to knuckles 84 and 85.

Figure 14:
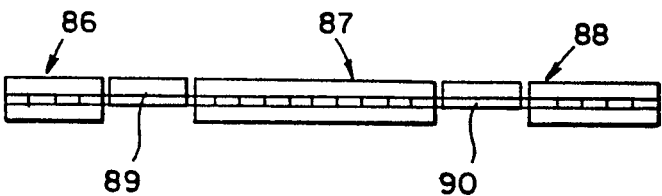

In FIG. 14 is seen the hinge at 51 of FIG. 2 which is in three parts 86 to 88 with two knuckles 89 and 90 for the struts or cable supports 21 of FIG. 2.

Figure 15:
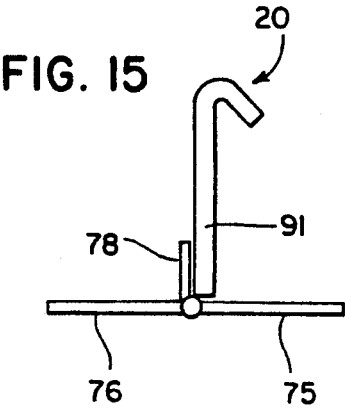
Figure 16:
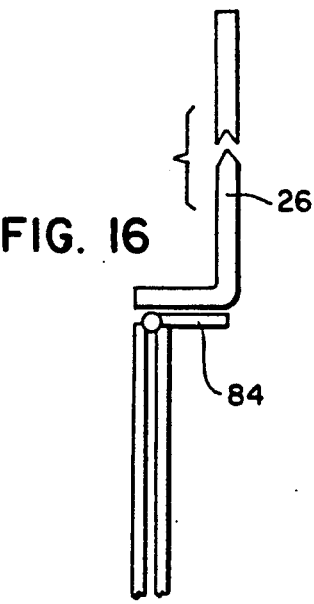
Figure 17:
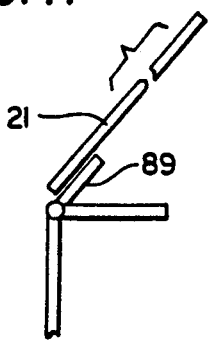

FIG. 15 is an end view of the hinge of FIG. 12 showing how the plate 91 of handle or clip 20 is attached to knuckle means 78. FIG. 16 is an end view of the hinge of FIG. 13 showing how the strut or cable support 26 is mounted to knuckle means 84. FIG. 17 shows the strut support 21 attached to knuckle 89 of FIG. 4.

A solid steel platform to the ramp allows for the application of an abrasive surface that is non-slip in character to be applied to the ramp. In closing the ramp, it starts to fold without any outside force or help once the ramp has been lifted to slightly above the horizontal position, at which time the user simply walks forward which allows the ramp to start its accordion like fold with very little assistance or lifting other than more a guiding action. The weight of the ramp might be between 32 to 40 lbs so that lifting it to fold it is not difficult. Once the second of the four panels has come to rest in the folding position, then the user uses his or her free hand to steady the remaining two panels while tucking inwardly the end panel and letting the then outer panel come to rest on its top. During the entire opening or extending of the ramp and during the folding of the ramp all of the supports are automatically forced to their closing or opening positions. The final folding over of the hinged handle locks the closed ramp in its closed position until it is needed to be used again.

In order to assist folding, a light cable might be attached at points 101, passed around sheaves at 98 and attached to a light spring to cause the struts 26 to collapse flat against panel 14 once panels 13 and 14 begin their closing action.

The addition of the ramp to a pickup tailgate adds the weight of the ramp to the tailgate, requiring additional effort in opening and closing the tailgate. To offset this weight, tension springs and cables can be added as in FIG. 2. When extended as in FIG. 2, another cable 102 might be added, in addition to cable stop 12 of FIG. 1, anchored to the pickup sidewall and extended down to the panel 13 to pass through opening 103 to a spring 104 extended across the width of the panel 13. A similar cable can be provided at the other side to join with spring 107. These springs may be housed inside shields or tubes 105 and 106. Passage of the cable through a right angle at 103 might be enabled by any suitable means such as a pulley, arcuate guide surface, bearing, etc. On folding, the cable 102 is drawn into the panel 13 as spring 104 contracts. FIG. 2 shows the springs 104 and 107 mounted in panel 13. Clearly, a similar mechanical advantage might be achieved with springs mounted in the tailgate. The same physical layout is readily mounted in either position.

The ramp can be made in any number of dimensions in width and extended length to accommodate any one of the range of compact or full size pickups without the loss of any strength and while never becoming larger in its storage position as far as space is concerned. The entire process of extending or securing of this ramp takes only seconds.

The installation of the ramp to a pickup is done by attaching panel 11 to the inside of the pickup tailgate by suitable connectors such as screws, rivets, etc. and by adding an additional length of cable to the existing tailgate cable. Installation is readily completed in a matter of minutes.

What is claimed is:
1. A collapsible ramp for connection to a vehicle tailgate, which ramp comprises:
   three wings interconnected by hinges so that they can be unfolded to a deployed position to extend the length of the vehicle tailgate substantially four fold;

one of said wings being hingedly connected to the tailgate so that the wings can be collapsed into a flat pack against the tailgate;

each pair of wings having one or more struts therebetween, each strut being pivotally mounted on a respective one of the hinges between the wings so as to permit collapse into the flat pack; and a plurality of cables, each stretched over one of the struts and affixed at either end to the wings, to support the wings, in their deployed position, against loads thereon.

2. A collapsible ramp as claimed in claim 1 wherein: the cable or cables spanning the wing pair closest to the tailgate are anchored at one end via a spring which extends on opening of the ramp to a point at which a cable stop limits extension and the ramp is flat.

3. A collapsible ramp as claimed in claim 2 wherein: the other end of the cable or cables spanning the wing pair closest to the tailgate is passed around a sheave or pulley to the end of the ramp.

4. A collapsible ramp as claimed in claim 3 wherein: a pair of spaced apart struts are provided on the hinge between the wing pair closest to the tailgate and a single length of cable spans across the wings over both struts, being passed around sheaves or pulleys at opposite ends of the ramp to return and join at opposite ends of said spring with cable stops at each end.

5. A collapsible ramp as claimed in claim 4 wherein: the struts on the hinge of the wing pair closest to the tailgate each have a cable attached thereto which is tensioned by a spring, when the ramp is extended, to pull the struts against the middle panel of the ramp as the ramp folds.

6. A collapsible ramp as claimed in claim 1 wherein: an additional hinged panel at the tailgate end of the ramp overlies the inner surface of the tailgate and is attached thereto.

7. A collapsible ramp as claimed in claim 1 wherein: the ramp wing closest to the tailgate is fitted with a spring attached by a cable to the side wall of the vehicle above the tailgate hinge to compensate for the weight of the ramp and tailgate when closing the tailgate.

8. A collapsible ramp as claimed in claim 1 wherein: the wings are sheet metal panels with box section perimeters and one or more top hat section ribs attached thereto beneath and a non-skid surface on top.

9. A collapsible ramp as claimed in claim 1 wherein: the wings are panels with box section edges and the hinges are piano style hinges with hinge plates attached to the panel edges.

10. A collapsible ramp as claimed in claim 9 wherein: the hinge pin of the hinge between the wing pair closest to the tailgate is stood off the lower surface of the ramp on extended hinge plates such that on folding a volume is established between the wing pair into which the third wing nests when the ramp is folded.

11. A collapsible ramp for connection to a vehicle tailgate, which ramp comprises:

a plurality of panel means;

hinge pins interconnecting adjoining panel means;

pairs of spaced apart struts mounted one pair to each hinge pin; and separate cables, one cable passed through each pair of struts;

each cable being passed over each of its struts via spaced apart sheaves located on the panel means away from their respective hinge pin and strut pair on each side to brace the adjoining panels against angular movement beyond 180°.

12. A collapsible ramp as claimed in claim 11 wherein:

the cable over one strut pair between two of the panels has its cable passed via sheaves to and around sheaves at the opposite end of the ramp.

13. A collapsible ramp as claimed in claim 12 wherein:

the cable, extended the length of the ramp, is passed about sheaves, its ends being joined by a tension spring.

* * * * *